United States Patent Office 3,442,790
Patented May 6, 1969

3,442,790
OLEFIN-SULFUR DIOXIDE COPOLYMERIC
WAX CRYSTAL MODIFIERS
Herbert G. Burkard, Roselle, Richard O. Henselman, North Plainfield, Harold N. Miller, Plainfield, and Norman Tunkel, Perth Amboy, N.J., assignors to Esso Research and Engineering Company, a corporation of Delaware
No Drawing. Filed July 26, 1966, Ser. No. 567,826
Int. Cl. C10g 43/20, 43/08
U.S. Cl. 208—28　　　　　　　　　　　　　　7 Claims

ABSTRACT OF THE DISCLOSURE

A wax crystal modifier composition comprising a copolymer of a $C_{10}$–$C_{50}$ substantially linear alpha olefin with sulphur dioxide. The copolymer may contain a minor amount of a third monomer, e.g., $C_2$–$C_{12}$ cyclic, or acyclic olefins. The copolymers are utilized in dewaxing processes.

---

This invention relates to a novel wax crystal modifier composition and to the utilization of same, and more particularly to a wax crystal modifier comprising a polymer of an alpha-olefin with sulfur dioxide.

Various methods are known in the art for separating wax from petroleum oil. One such method, for instance, is chilling the waxy oil and filtering off the solid wax. One of the most popular ways of dewaxing oils is known as solvent dewaxing. This comprises diluting the oil with a solvent, heating until complete solution is obtained, and then chilling until the desired amount of wax has crystallized out. The wax crystals thus formed are separated from the slurry by means of filtration. The wax is then further purified, while the solvent is recovered for reuse and the dewaxed oil is sent to other refinery processes.

Although such solvent dewaxing has largely replaced other processes for the separation of wax from hydrocarbon oils, filtration of the wax crystals from the slurry formed during dewaxing is difficult and often the filtration rate of the slurry limits the capacity of the entire process. The slurry filtration rate is determined primarily by the size and shape of the wax crystals formed during the chilling step of the process. Very fine crystals tend to clog the filter media rapidly, reducing the filtration rate and eventually necessitating shutdown of the filters for removal of the accumulated wax. Very large crystals tend to form gel-like interlocking masses which do not form a compact filter cake, which contain a large amount of oil and solvent, and which are difficult to wash. As a solution to this problem, it has become the practice in the art to incorporate in the wax-containing petroleum oil materials which modify the size and shape of wax crystals in such a manner as to permit more rapid separation of the wax during dewaxing operations. These materials are known as wax crystal modifiers. For example, it has been known for some time that Friedel-Crafts condensation products of halogenated paraffins and aromatic hydrocarbons are effective wax crystal modifiers (e.g., pour depressants, dewaxing aids, etc.) for wax-containing petroleum oils. However, in many instances the prior art materials do not meet the requirements imposed by present day petroleum needs. The provision of new and more efficient wax crystal modifiers is, therefore, of great importance to the petroleum art.

It has now been found, in accordance with this invention, that by incorporating in a petroleum oil, as a wax crystal modifier, a polymer of an alpha-olefin with sulfur dioxide, a substantial improvement in the wax crystal characteristics of the oil is obtained. It is therefore, the primary object of this invention to provide a new and highly improved class of wax crystal modifiers. Other and further objects of the invention will become apparent from the following detailed description thereof.

The alpha-olefins which are effective to attain the objectives of the invention may be represented by the following general formula: $H_2C=CHR$ wherein R is a hydrocarbon radical containing a substantially linear alkyl group of at least 10 carbon atoms. In essence, R may be branched or unbranched and may contain cyclic structures but there should be a substantially linear alkyl side chain containing at least 10 carbon atoms, e.g., R may be a phenyl group containing a $C_{10}$–$C_{40}$ alkyl substituent. It is preferred, however, that R be a linear alkyl containing from about 12 to about 30 carbon atoms, although alkyls containing up to 50 carbon atoms are suitable. Nonlimiting examples of suitably employed alpha-olefins include decene-1, dodecene-1, tetradecene-1, hexadecene-1, octadecene-1, eicosene-1, docosene-1, pentacosene-1, hexacosene-1, octocosene-1, triacotene-1, dotriacotene-1, tetracotene-1, $C_{10}$–$C_{40}$ alkyl styrene, $C_{10}$–$C_{40}$ alkyl alpha methyl styrene, the like and mixtures thereof.

In general, the polymeric wax crystal modifiers of this invention have a number average molecular weight in the range of from about 1,500 to 100,000 or more, i.e., the upper range is limited only by the polymer oil solubility, and preferably comprise substantially equimolar amounts of the aforedescribed alpha-olefin and sulfur dioxide. Although in essence the polymer is an alternating copolymer of an olefin and sulfur dioxide, it is understood that in some instances the respective molar amounts of the olefin and sulfur dioxide contained within the polymer may not necessarily be the same. For example, in the presence of a suitable polymerization catalyst such as those hereinafter described, it would be expected that some homopolymerization of the olefin would take place, thereby producing a polymer containing more than 50 mole percent of the olefin monomer. The present invention, therefore, contemplates the use of a polymer comprising from about 50 to about 70 mole percent of an olefin and from about 30 to about 50 mole percent sulfur dioxide.

The olefin-sulfur dioxide polymers suitably employed in the present invention may contain a minor amount of a third type of monomer which is not an alpha-olefin within the carbon atom range recited above, e.g., a cyclic or acyclic olefin containing from about 2 to about 12, preferably 2–9, carbon atoms. In general, it is found that from 0 to about 40 wt. percent, e.g., 15 wt. percent, of the aforedescribed alpha-olefin may be replaced by the third type of monomer. Nonlimiting examples of these suitable monomers include ethylene, propylene, hexene-2, octene-1, norbornylene, cyclohexene, cyclooctene, cyclododecene, and the like.

While the wax crystal modifiers of this invention may be utilized in a number of petroleum base stocks such as resuidua, middle distillates, e.g., heating oils, diesel fuels, kerosene, aviation turbo-jet fuels and the like, it has special application to waxy lubricating oil fractions. These fractions generally range in boiling points from about 350° to 1,000° F. and contain from about 1 to about 25 wt. percent wax.

Polymerization of the aforedescribed monomers may be effected with or without the presence of a catalyst. In general, any of the conventional free radical catalyst, e.g., those of the peroxide or azo-type, may be used. By way of example, suitable peroxide-type catalysts include benzoyl peroxide, ditertiary butyl peroxide, tertiary butyl hydroperoxide, diacetyl peroxide, diethyl peroxycarbonate, 2-phenyl propane-2-hydroperoxide (known also as cumene hydroperoxide). The azo-type polymerization catalysts are also well known to those skilled in the art. These are characterized by the presence in the molecule of the group —N=N— bonded to one or two organic radicals, preferably at least one of the bonds being to a tertiary carbon atom. By way of example of suitable azo-type catalysts can be mentioned α, α' azodiisobutyronitrile, p-bromobenzenediazonium fluoborate, N-nitroso-p-bromoacetanilide, azomethane, phenyldiazonium halides, diazoaminobenzene, p-bromobenzenediazonium hydroxide, p-tolyldiazoaminobenzene. The polymerization catalyst is used in small amounts, which are generally not in excess of two percent by weight based upon the monomeric material. A suitable quantity is often in the range of 0.05 to 0.5 percent by weight.

In preparing the wax crystal modifiers of the present invention, the monomers are reacted in molar ratios ranging from about 0.1 to about 10 moles of sulfur dioxide per mole of olefin. Polymerization is effected by conventional methods. For example, the olefin, a solvent and catalyst, may be charged into a flask equipped with a stirrer, a Dry Ice condenser and a sulfur dioxide inlet. Sulfur dioxide is then introduced into the inlet and the polymerization is conducted at −20° to 30° C., preferably 0° to 20° C., for about 15 minutes to 6 hours or until reaction of the olefin is complete. The polymerization solvent useful herein may be any suitable inert hydrocarbon solvent such as benzene, toluene, n-heptane, hexane, cyclohexane and the like. Alternately, the polymerization may be conducted at elevated temperatures and superatmospheric pressures by charging the reactants into a pressure reactor, e.g., a rocker bomb, and maintaining the reaction at a temperature of from about −10° to about 100° C., or higher, until reaction of the olefin is complete.

The wax crystal modifier of this invention may be blended directly with the aforedescribed wax-containing petroleum oils. Concentrations within the range of from about .005 to about 4.0 wt. percent by weight based on the weight of the wax-containing oil, will be operable and will give the desired improvement in flow and wax separation characteristics. Based on economic reason, from about 0.01 to about 0.5 wt. percent of the additive is preferably employed.

Particularly, desirable results are obtained when the wax crystal modifiers of the present invention are utilized in the conventional solvent dewaxing processes. For example, admixtures of the wax crystal modifier, dewaxing solvent and wax-containing oil may be processed by chilling the said admixture in any suitable manner to a wax precipitation temperature. The precipitated wax may then be removed by centrifugation or filtration, preferably the latter. Dewaxing operations are preferably conducted at a temperature within the range of about −30° F. to about +20° F. and, more preferably, at a temperature within the range of about −10° to about +5° F.

In the dewaxing processes, the amount of materials admixed will vary widely depending upon the particular dewaxing solvent used, as well as the type of petroleum oil being dewaxed. In general, it has been found that solvent dewaxing feeds comprising the hereinbefore specified amount of wax crystal modifier, from about 50 to about 90 wt. percent of the dewaxing solvent and from about 10 to about 50 wt. percent of the wax-containing petroleum oil can be easily and efficiently filtered in conventional dewaxing filtration equipment. Nonlimiting examples of suitable dewaxing solvents include benzene, toluene, acetone, methylethyl ketone, propane hexane, ethylene dichloride, aliphatic alcohols, naphtha, the like and mixtures thereof.

The wax crystal modifiers of this invention are found compatible with other additive materials and may be blended successfully with petroleum oils containing minor amounts of viscosity index improvers, rust inhibitors, lubricity agents, oxidation inhibitors and the like. The invention can be more fully understood by reference to the following examples.

EXAMPLE 1

This example serves to illustrate the preparation of a wax crystal modifier of the instant invention.

In this example, 28 grams of 1-eicosene, 100 grams of benzene and 0.3 grams of methylethyl ketone hydroperoxide catalyst were charged to a stirred three-neck flask equipped with a Dry Ice condenser and cooled by means of a wet ice bath. Excess sulfur dioxide, i.e., 20 grams, was then introduced at 0° to 20° C. over a period of about 30 minutes. The reaction temperature was then maintained at about 0° to 20° C. for a period of about 30 minutes. Upon completion of the reaction, unreacted sulfur dioxide and benzene were removed by blowing with nitrogen at about 100° C. for a period of about 4 hours. The product recovered, i.e., 31 grams, was a white, gelatinous resin.

The product, i.e., 31 grams, was dissolved in hexane and dialyzed at reflux temperature for 24 hours. As employed herein, the term dialysis relates to the preferential diffusion of one or more lower molecular weight components of a solution of hydrocarbons in a specific solvent through a semi-permeable membrane in the direction of a liquid phase consisting predominantly of solvent. In general, higher molecular weight components are found to diffuse very slowly or not at all while, lower molecular weight components in true solution diffuse rapidly. Accordingly, the foregoing dialysis yielded 11 grams of a residue material having a number average molecular weight of about 9,020 and 17 grams of an extract material having a number average molecular weight of about 1,790. The respective products were then blended in the amount hereinafter specified with an intermediate viscosity lube oil stock having the properties shown in Table I and hereinafter referred to as test oil.

Table I.—Properties of test oil

Inspection:
    ASTM viscosity at 210° F., SUS _____ 52.0
    Boiling point range, ° F. _____ 400–900
    Flash point, ° F., COC _____ 460
    ASTM pour point, ° F. _____ 120+
    Wax content, wt. percent _____ 14

EXAMPLE 2

The test oil was dewaxed by diluting with a solvent consisting of 57 wt. percent methylethyl ketone and 43 wt. percent toluene at a solvent/oil ratio of 3.5/1 and then chilling at the rate of 3° F. per minute from a feed temperature of 140° F. to a filter temperature of −10° F. The chilled mixture was then continuously filtered through a refrigerated circular leaf filter at a pressure differential of 25 inches of mercury. The filtration cycle consisted of a filtration time of 33 seconds, a drying time of 10 seconds, a wash time of 22 seconds, and a second drying time of 17 seconds.

The test oil was also dewaxed in the same manner as above except that 0.05 wt. percent (based on weight of wax-containing oil) of the wax crystal modifier products prepared in Example 1, i.e., the dialysis residue and extract, were each added to a separate oil sample prior to chilling. The feed mixtures comprising the individual wax crystal modifiers were then separately processed under the same dewaxing conditions as used in the first operation wherein no wax crystal modifier was employed.

The data obtained from the above-respective dewaxing operations were as shown in Table II.

Table II.—Dewaxing and intermediate viscosity lube stock [1]

| Dewaxing aid used: | Filtration rate, gal./hr. ft.$^2$ |
|---|---|
| None | 20 |
| 0.05 wt. percent of dialysis residue | 38 |
| 0.05 wt. percent of dialysis extract | 42 |

[1] Test Oil of Table I.

From the data in Table II, the marked superiority secured in a dewaxing operation by the use of the wax crystal modifiers of the present invention is readily apparent. Thus, the use of the wax crystal modifiers has, in this example, imparted about a 100 percent improvement in the oil filtration rate.

EXAMPLE 3

The process of Example 1 is repeated except that the 1-eicosene is replaced with an equimolar amount of 1-dodecene. The resulting product is found to be an effective wax crystal modifier.

EXAMPLE 4

The process of Example 1 is repeated except that the 1-eicosene is replaced with an equimolar amount of 1-hexacosene. The resulting product is found to be an effective wax crystal modifier.

It is not intended that this invention be limited to the specific examples presented by way of illustration. The scope of the invention is limited only by the appended claims.

What is claimed is:

1. A composition comprising a major proportion of a wax-containing oil and a wax-modifying effective amount of an oil-soluble copolymer comprised of from about 50 to about 70 mol percent of a $C_{10}$–$C_{50}$ substantially linear alpha-olefin and from about 30 to about 50 mol percent of sulfur dioxide.

2. The composition of claim 1 wherein the said alpha-olefin contains from about 12 to about 30 carbon atoms.

3. The composition of claim 2 wherein the number average molecular weight of the said copolymer is within the range between about 1,500 and 100,000.

4. The composition of claim 1 wherein the said copolymer contains substantially equimolar amounts of said alpha-olefin and sulfur dioxide.

5. The composition of claim 4 wherein the said alpha-olefin and contains from about 12 to about 30 carbon atoms.

6. The composition of claim 1 wherein from 0 to about 40% of the said alpha-olefin is replaced by a $C_2$–$C_9$ olefin.

7. In the process for the separation of wax from petroleum oils by the steps which include chilling the oil to form solid wax crystals and removing said wax crystals; the improvement of incorporating into said oil prior to formation of said wax crystals, a wax crystal modifying effective amount of an oil soluble copolymer comprised of from about 50 to about 70 mol percent of a $C_{10}$–$C_{50}$ substantially linear alpha-olefin and from about 30 to about 50 mol percent of sulfur dioxide.

References Cited

UNITED STATES PATENTS

| 2,976,269 | 3/1961 | de Jong | 260—79.3 |
| 3,355,379 | 11/1967 | Leonard | 208—33 |

DANIEL E. WYMAN, *Primary Examiner.*

P. E. KONOPKA, *Assistant Examiner.*

U.S. Cl. X.R.

208—33, 31; 252—48.2; 44—62; 260—79.3